(12) United States Patent
Yoon

(10) Patent No.: US 9,056,301 B2
(45) Date of Patent: Jun. 16, 2015

(54) METHOD FOR REDUCING CARBON DIOXIDE BY USING SUNLIGHT AND HYDROGEN AND APPARATUS FOR SAME

(75) Inventor: Kyung Byung Yoon, Seoul (KR)

(73) Assignee: Sogang University Research Foundation, Seoul (KR)

( * ) Notice: Subject to any disclaimer, the term of this patent is extended or adjusted under 35 U.S.C. 154(b) by 13 days.

(21) Appl. No.: 14/235,675

(22) PCT Filed: Jul. 30, 2012

(86) PCT No.: PCT/KR2012/006063
§ 371 (c)(1),
(2), (4) Date: Jan. 28, 2014

(87) PCT Pub. No.: WO2013/015663
PCT Pub. Date: Jan. 31, 2013

(65) Prior Publication Data
US 2014/0179810 A1    Jun. 26, 2014

(30) Foreign Application Priority Data
Jul. 28, 2011 (KR) ................ 10-2011-0075067

(51) Int. Cl.

| | |
|---|---|
| C07C 1/00 | (2006.01) |
| C07C 27/00 | (2006.01) |
| B01J 19/08 | (2006.01) |
| C01B 6/00 | (2006.01) |
| B01J 19/12 | (2006.01) |
| B01J 23/44 | (2006.01) |
| C01B 31/20 | (2006.01) |
| C07C 1/12 | (2006.01) |
| C07C 9/04 | (2006.01) |
| B01J 21/06 | (2006.01) |
| B01J 23/42 | (2006.01) |
| B01J 23/72 | (2006.01) |
| B01J 23/755 | (2006.01) |
| B01J 35/00 | (2006.01) |
| C01B 31/02 | (2006.01) |
| C01B 31/18 | (2006.01) |

(52) U.S. Cl.
CPC ............... *B01J 19/127* (2013.01); *B01J 23/44* (2013.01); *C01B 31/20* (2013.01); *C07C 1/12* (2013.01); *C07C 9/04* (2013.01); *B01J 21/063* (2013.01); *B01J 23/42* (2013.01); *B01J 23/72* (2013.01); *B01J 23/755* (2013.01); *B01J 35/004* (2013.01); *C01B 31/02* (2013.01); *C01B 31/18* (2013.01); *B01J 2219/0883* (2013.01); *B01J 2219/0892* (2013.01)

(58) Field of Classification Search
CPC ............ B01J 35/004; C07C 1/22; C07C 9/04; C01B 3/38; C10G 2/50; C25B 3/04
USPC .......... 204/157.15; 422/186.04, 162; 518/700
See application file for complete search history.

(56) References Cited

U.S. PATENT DOCUMENTS

| 4,523,981 A | 6/1985 | Ang et al. |
| 4,620,906 A | 11/1986 | Ang |

FOREIGN PATENT DOCUMENTS

| JP | 05-229967 | 9/1993 |
| JP | 2004-059507 | 2/2004 |

OTHER PUBLICATIONS

Willner et al., Photosensitized reduction of carbon dioxide to methane, Journal of the American Chemical Society (1987), 109(20), 6080-6086.*
International Search Report issued in International App. No. PCT/KR2012/006063, mailed Feb. 18, 2013.

* cited by examiner

*Primary Examiner* — Jafar Parsa
(74) *Attorney, Agent, or Firm* — Greer Burns & Crain Ltd.

(57) ABSTRACT

The present disclosure relates to a reducing method of carbon dioxide using sunlight and hydrogen, and an apparatus therefor.

20 Claims, 16 Drawing Sheets

FIG. 4
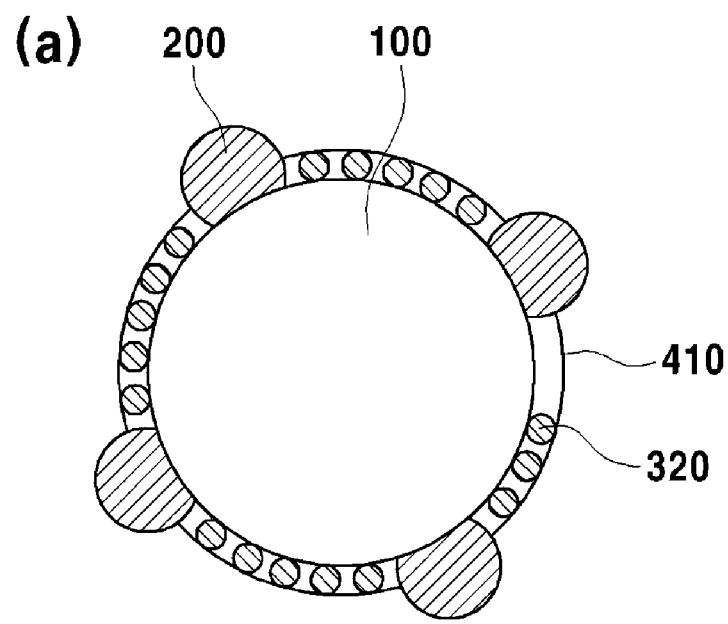
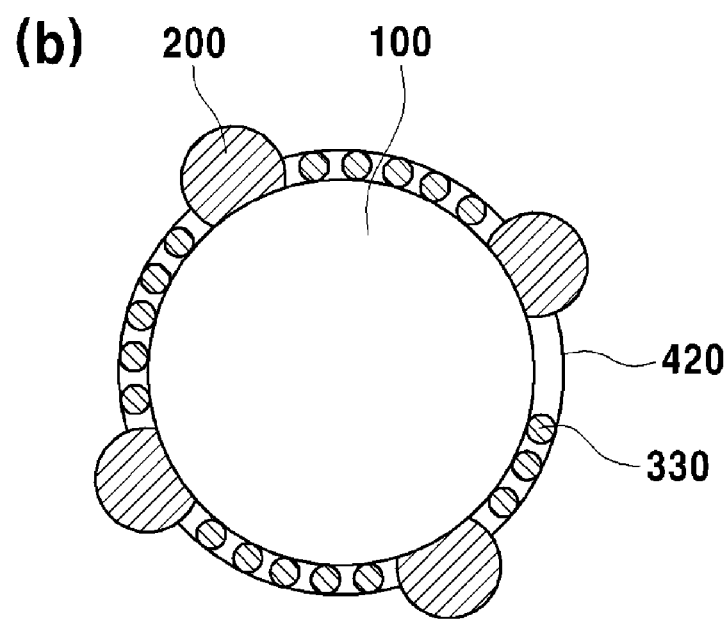

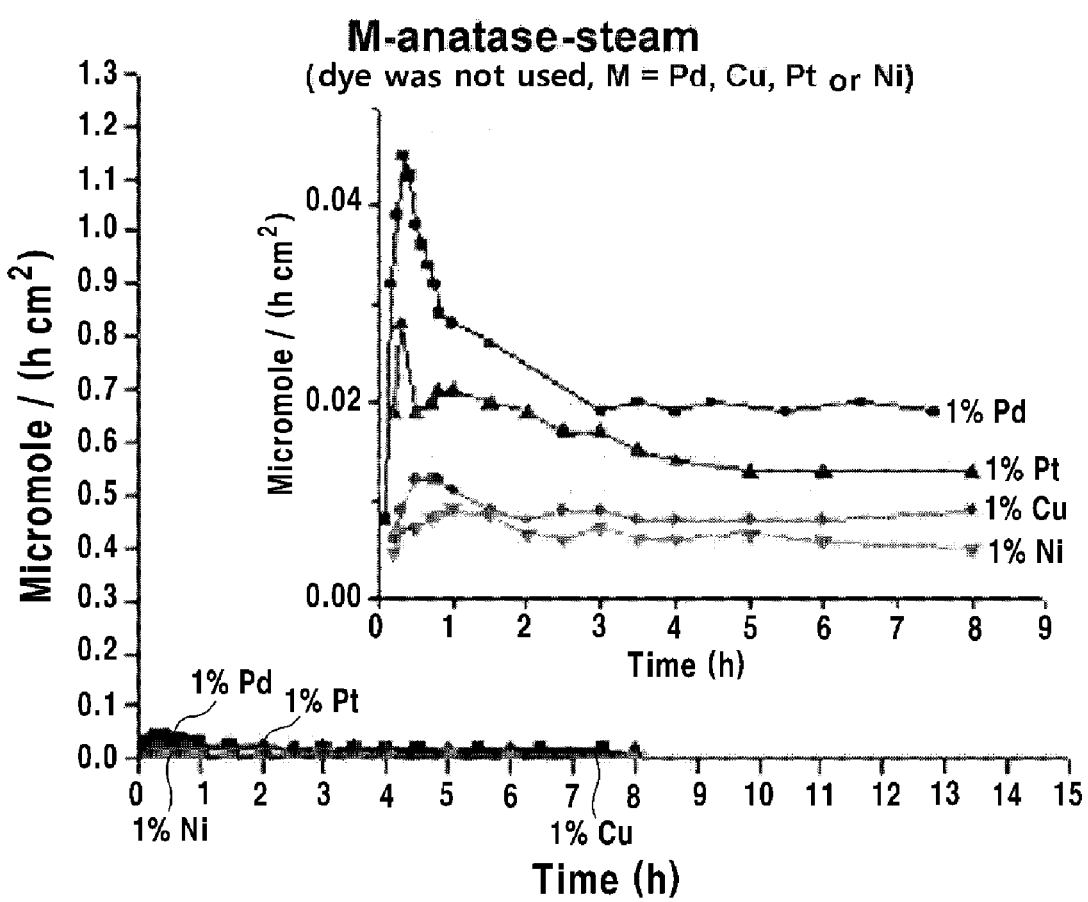

METHOD FOR REDUCING CARBON DIOXIDE BY USING SUNLIGHT AND HYDROGEN AND APPARATUS FOR SAME

TECHNICAL FIELD

The present disclosure relates to a reducing method of carbon dioxide using sunlight and hydrogen, and an apparatus therefor.

BACKGROUND ART

Photosynthesis is a reaction for converting carbon dioxide and water into oxygen and starch by using solar light as energy. Such photosynthesis actively occurs in green plants and photosynthesis bacteria. Contrary to the photosynthesis in the realm of nature, artificial photosynthesis is a reaction for converting carbon dioxide and water into oxygen, liquid fuel, etc., by using solar light as energy.

In the chemical aspect, carbon dioxide ($CO_2$) and water ($H_2O$) are materials having very low potential energy, while fuel and oxygen are materials having relatively high potential energy. Plants in the realm of nature convert carbon dioxide and water into carbohydrate and oxygen ($O_2$) which are materials having relatively high potential energy by using solar energy through photosynthesis. Once the converted carbohydrate and oxygen are reacted once again, they are converted back into carbon dioxide and water. Heat equal to the difference in potential energy between the two reaction materials is discharged outward.

Meanwhile, human beings have obtained energy through combustion of fossil fuel, that is, a reaction for reacting fossil fuel with oxygen to produce carbon dioxide and water. As a result, a concentration of carbon dioxide in the air is increasing every day. This has become a primary cause for global warming. The global warming is being faster and has been regarded as one of the critical factors of the global environmental problems.

Accordingly, there have been worldwide efforts to raise applicability of renewable energy such as solar energy, water power, wind power, tidal energy, geothermal heat, bio fuel, etc., instead of the fossil fuel. Among the energy, solar energy is the most promising renewable energy.

As a conventionally developed method for utilizing solar energy, there is a method for converting solar heat and solar light into electric energy. However, of the electric power produced throughout the world, the electric power produced by using solar energy is too small in an amount to be ignored. Moreover, a solar cell has already reached the limit of its efficiency, and the unit price of production of solar cells is increasing. Accordingly, the necessity to realize artificial photosynthesis for producing useful materials by using solar light, water and carbon dioxide is increasing.

However, the artificial photosynthesis has not been realized even at the level of a laboratory despite the fact that many scientists have put forth their efforts for the last century. Accordingly, success in the research of artificial photosynthesis is expected to greatly contribute to improvement of global environment and development of scientific technologies.

DISCLOSURE OF THE INVENTION

Problems to be Solved by the Invention

The present disclosure provides a reducing method of carbon dioxide using sunlight and hydrogen under the presence of a composite catalyst containing a metal, a metal compound and a photosensitizer.

However, the problems sought to be solved by the present disclosure are not limited to those described above. Other problems, which are sought to be solved by the present disclosure but are not described in this document, can be clearly understood by one of ordinary skill in the art from the descriptions below.

Means for Solving the Problems

In accordance with one aspect of the present disclosure, there is provided a reducing method of carbon dioxide using sunlight and hydrogen, including loading a composite catalyst containing a metal, a metal compound, and a photosensitizer into a reactor; injecting a gas containing hydrogen gas and carbon dioxide gas into the reactor to react the hydrogen gas with the carbon dioxide gas under sunlight irradiation.

In accordance with another aspect of the present disclosure, there is provided a reaction apparatus for reducing carbon dioxide using sunlight and hydrogen, including a reactor including a light transmission member on at least one side; and a hydrogen gas supplying member, a carbon dioxide gas supplying member, and a product outlet member which are connected to the reactor, wherein hydrogen gas is supplied to the reactor through the hydrogen gas supplying member, carbon dioxide gas is supplied to the reactor through the carbon dioxide gas supplying member, and sunlight is irradiated to the reactor through the light transmission member in the presence of a composite catalyst containing a metal, a metal compound, and a photosensitizer loaded into the reactor so that the hydrogen gas and the carbon dioxide gas are reacted.

Effect of the Invention

According to the reducing method of carbon dioxide using sunlight and hydrogen and the apparatus therefor in the present disclosure, liquid fuels such as hydrocarbons, ketones, aldehydes, alcohols, and etc can be produced by reducing carbon dioxide by using hydrogen and carbon dioxide as raw materials and sunlight as energy under the presence of a composite catalyst containing a metal, a metal compound and a photosensitizer. Especially, reduction efficiency of the carbon dioxide can be further improved by adding water to the hydrogen and the carbon dioxide. Furthermore, the composite catalyst can be prepared containing materials using low-cost and common elements. Accordingly, by using the reducing method of carbon dioxide using sunlight and hydrogen and the apparatus therefor in accordance with the present disclosure, it is possible to improve efficiency of production processes for fuel materials through reduction of carbon dioxide and contribute to commercialization of the fuel materials.

BRIEF DESCRIPTION OF THE DRAWINGS

FIG. 4 is a schematic diagram showing a composite catalyst having a form, in which a particle of a metal and a photosensitizer mixed in an anionic polymer or a cationic polymer are coated on a surface of a support containing a metal compound, in accordance with an illustrative embodiment of the present disclosure.

FIGS. 5A to 5D provide graphs showing a production rate of a methane gas, for each reaction condition, in a product of a carbon dioxide reduction reaction by a composite catalyst in accordance with an example of the present disclosure.

BEST MODE FOR CARRYING OUT THE INVENTION

Hereinafter, illustrative embodiments and examples of the present disclosure will be described in detail so that inventive concept may be readily implemented by those skilled in the art.

However, it is to be noted that the present disclosure is not limited to the illustrative embodiments and the examples but can be realized in various other ways.

Throughout the whole document, the term "comprises or includes" and/or "comprising or including" means that one or more other components, steps, operations, and/or the existence or addition of elements are not excluded in addition to the described components, steps, operations and/or elements. The terms "about or approximately" or "substantially" used in this document are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Through the whole document, the term "on" that is used to designate a position of one element with respect to another element includes both a case that the one element is adjacent to the another element and a case that any other element exists between these two elements.

Hereinafter, the present disclosure is described in detail with reference to illustrative embodiments, examples and drawings. However, the present disclosure is not limited to the illustrative embodiment, the examples and the drawings.

The first aspect of the present disclosure may provide a reducing method of carbon dioxide using sunlight and hydrogen, which includes: loading a composite catalyst containing a metal, a metal compound, and a photosensitizer into a reactor; and injecting a gas containing hydrogen gas and carbon dioxide gas into the reactor to react the hydrogen gas with the carbon dioxide gas under sunlight irradiation.

In accordance with an illustrative embodiment of the present disclosure, the gas containing the hydrogen gas and the carbon dioxide gas which are injected into the reactor may further include water ($H_2O$), but may not be limited thereto.

Figure 1:
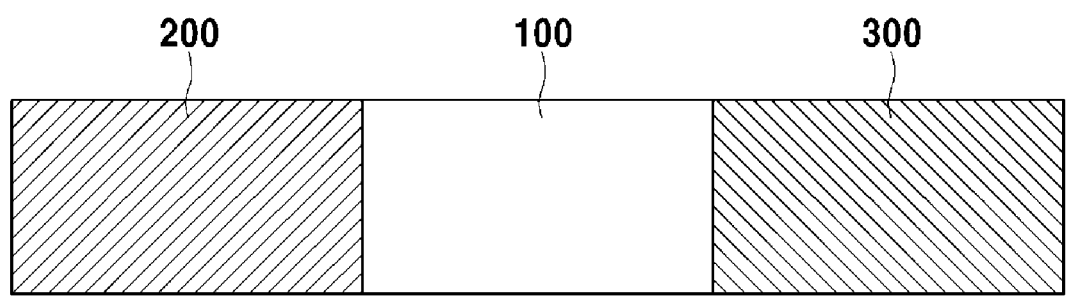
FIG. 1 is a schematic diagram showing a composite catalyst containing a metal, a metal compound, and a photosensitizer in accordance with an illustrative embodiment of the present disclosure.
Figure 2:
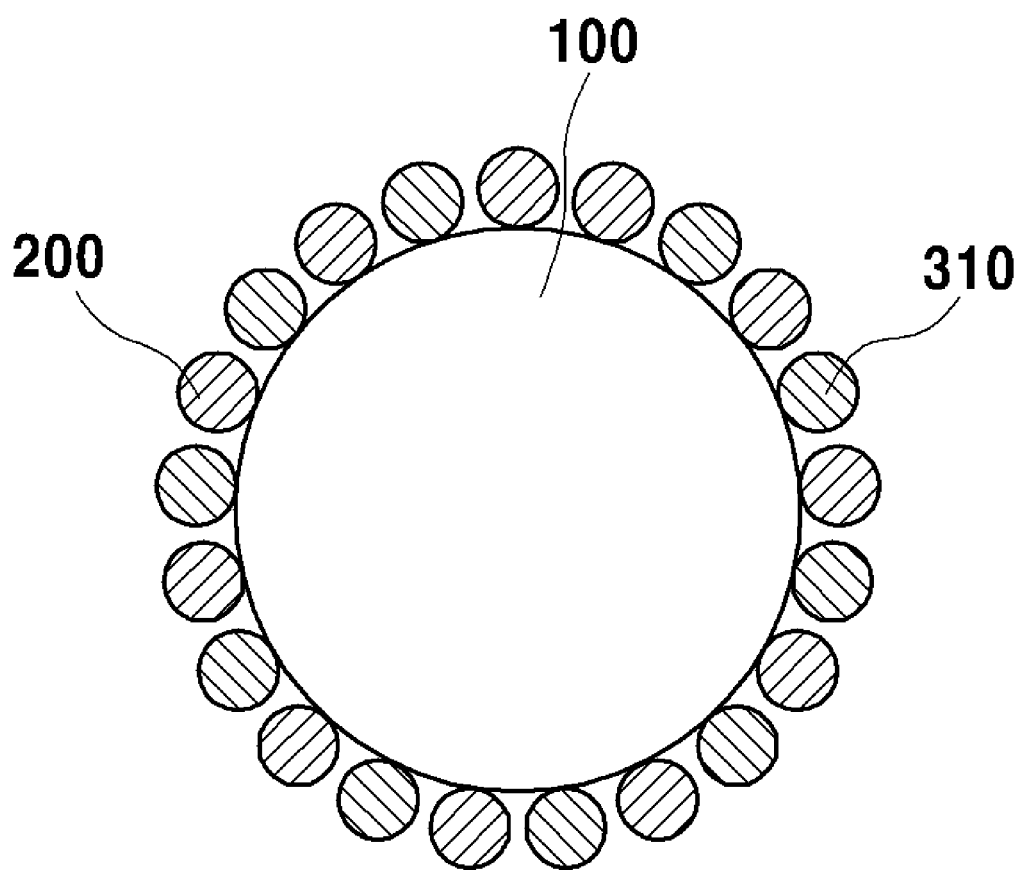
FIG. 2 is a schematic diagram showing a composite catalyst having a form, in which a particle of a metal and a photosensitizer are coated on a surface of a support containing a metal compound, in accordance with an illustrative embodiment of the present disclosure.

In accordance with an illustrative embodiment of the present disclosure, as shown in FIGS. 1 and 2, the composite catalyst includes a metal 200 containing a metal ion, a metal compound 100 and a photosensitizer 300. More specifically, a particle of the metal 200 and the photosensitizer, e.g., a photosensitizer 310 including a linker, a cationic photosensitizer which does not include a linker 320, or an anionic photosensitizer which does not include a linker 330, may be coated on a surface of a support containing the metal compound 100. However, the present disclosure may not be limited thereto.

Figure 3:
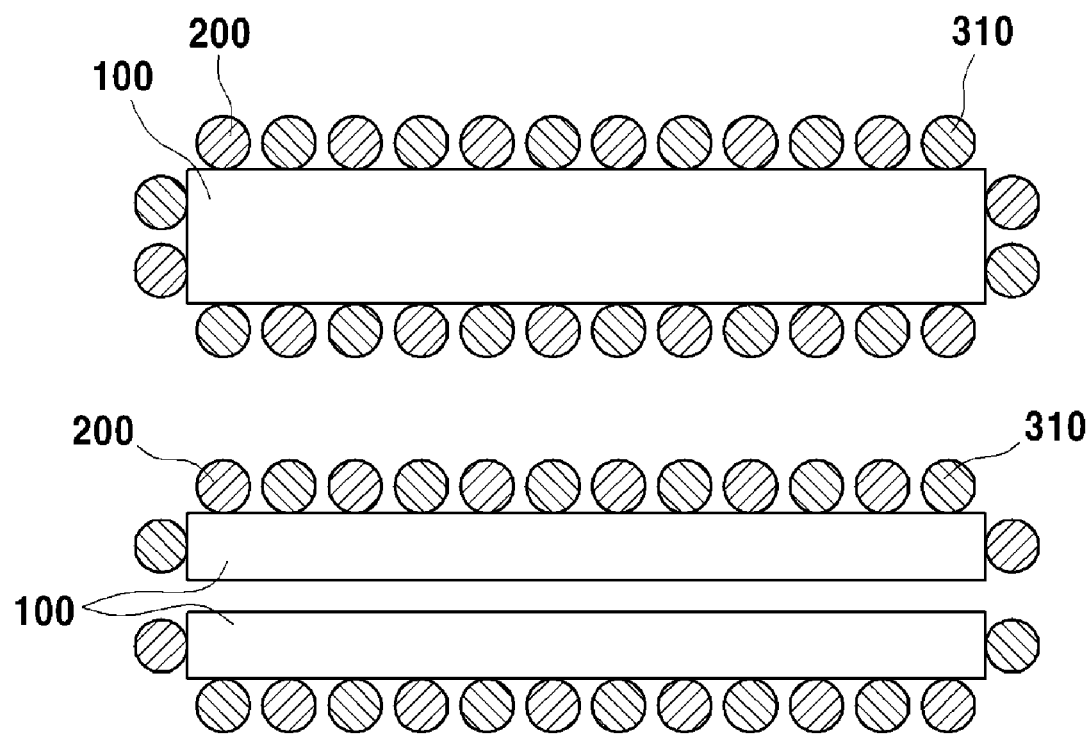
FIG. 3 is a schematic diagram showing a composite catalyst having a form, in which a particle of a metal and a photosensitizer are coated on a surface of a support containing a metal compound, in accordance with an illustrative embodiment of the present disclosure.
Figure 5A:
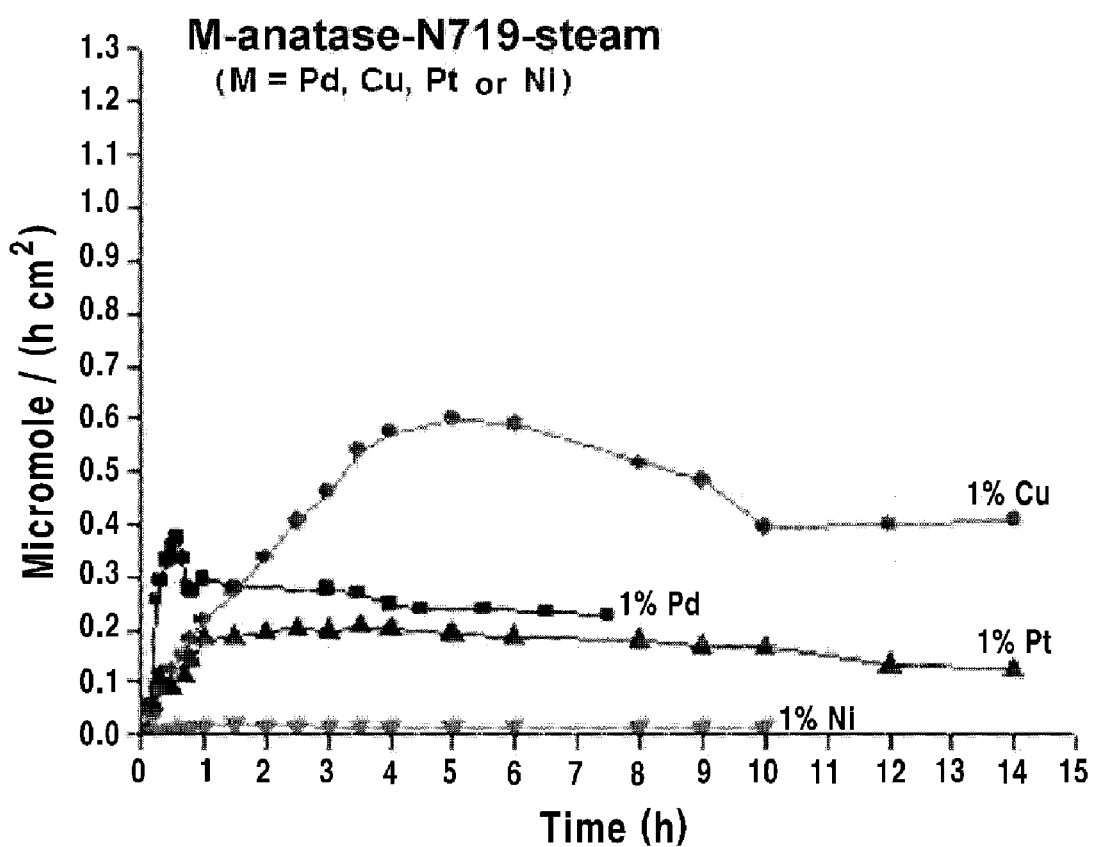
Figure 5B:
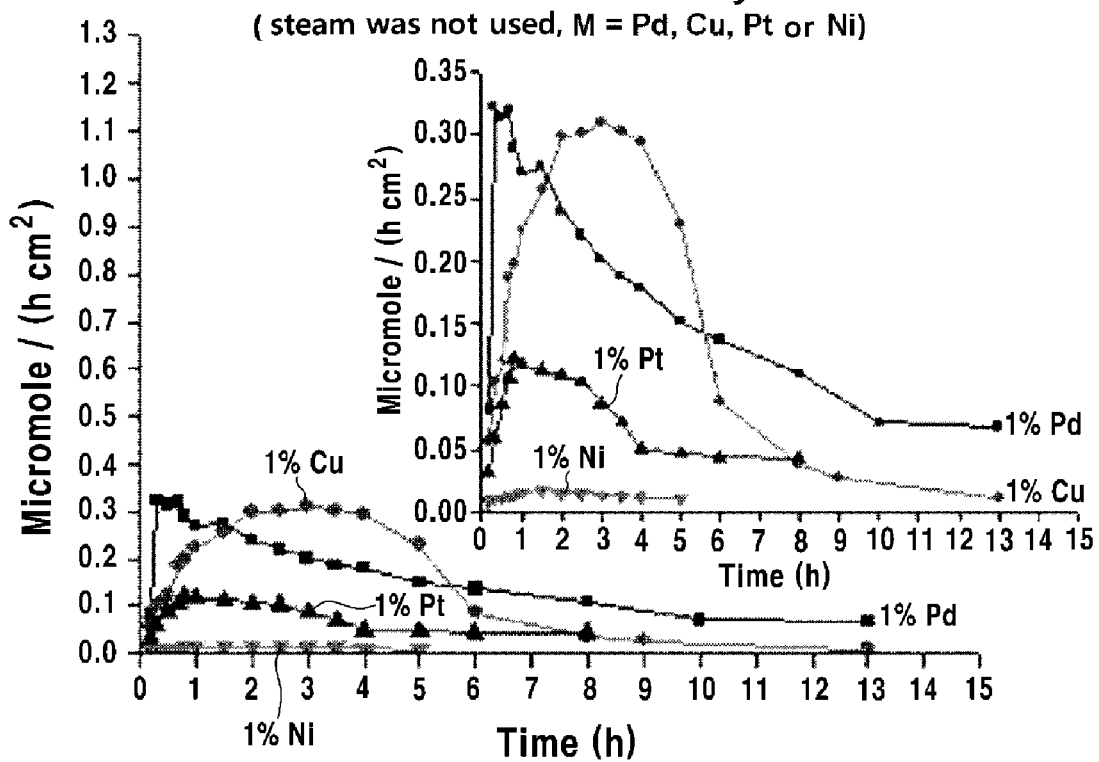
Figure 5D:
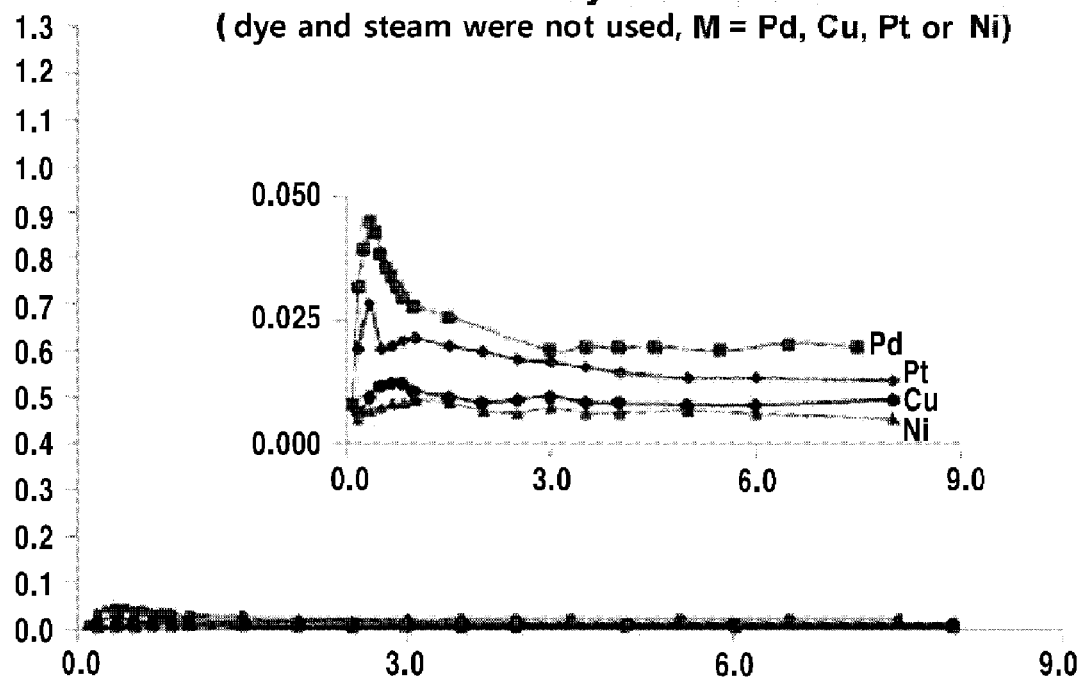
Figure 6:
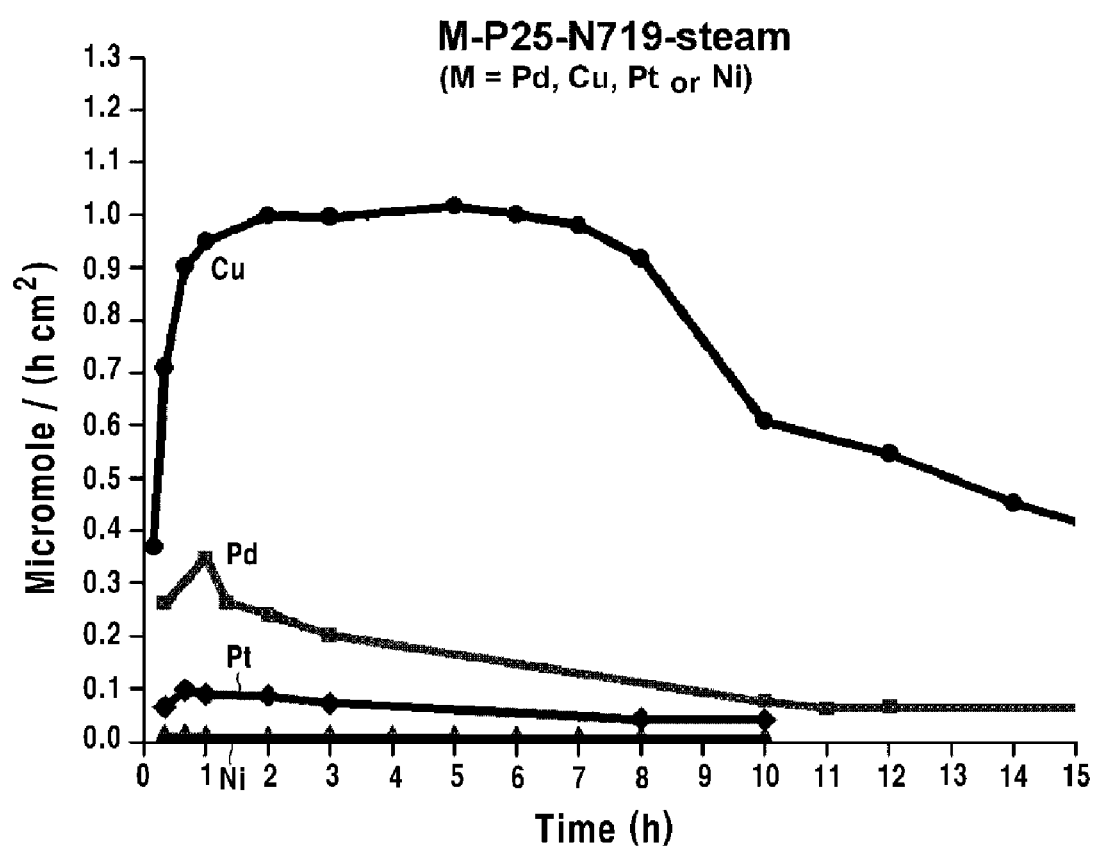
FIG. 6 provides a graph showing a production rate of a methane gas in a product of a carbon dioxide reduction reaction by a composite catalyst in accordance with an example of the present disclosure.
Figure 7:
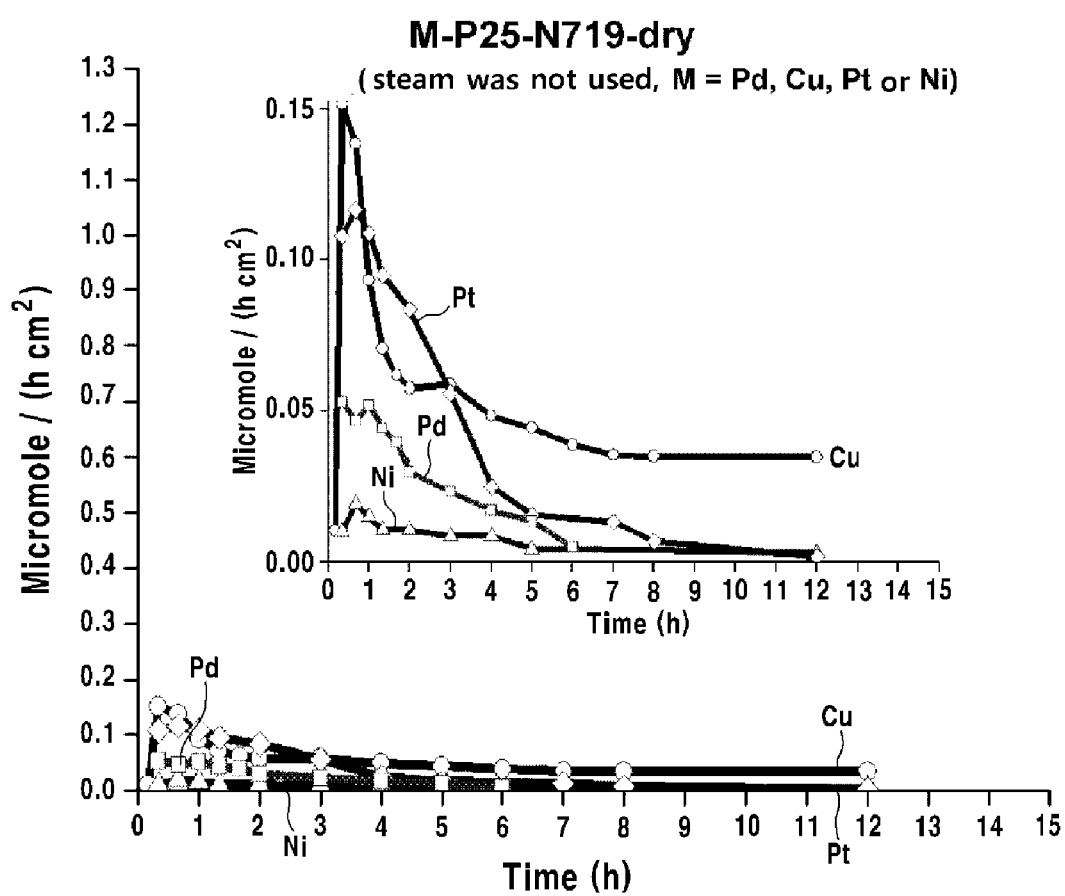
FIG. 7 provides a graph showing a production rate of a methane gas in a product of a carbon dioxide reduction reaction by a composite catalyst in accordance with an example of the present disclosure.
Figure 8:
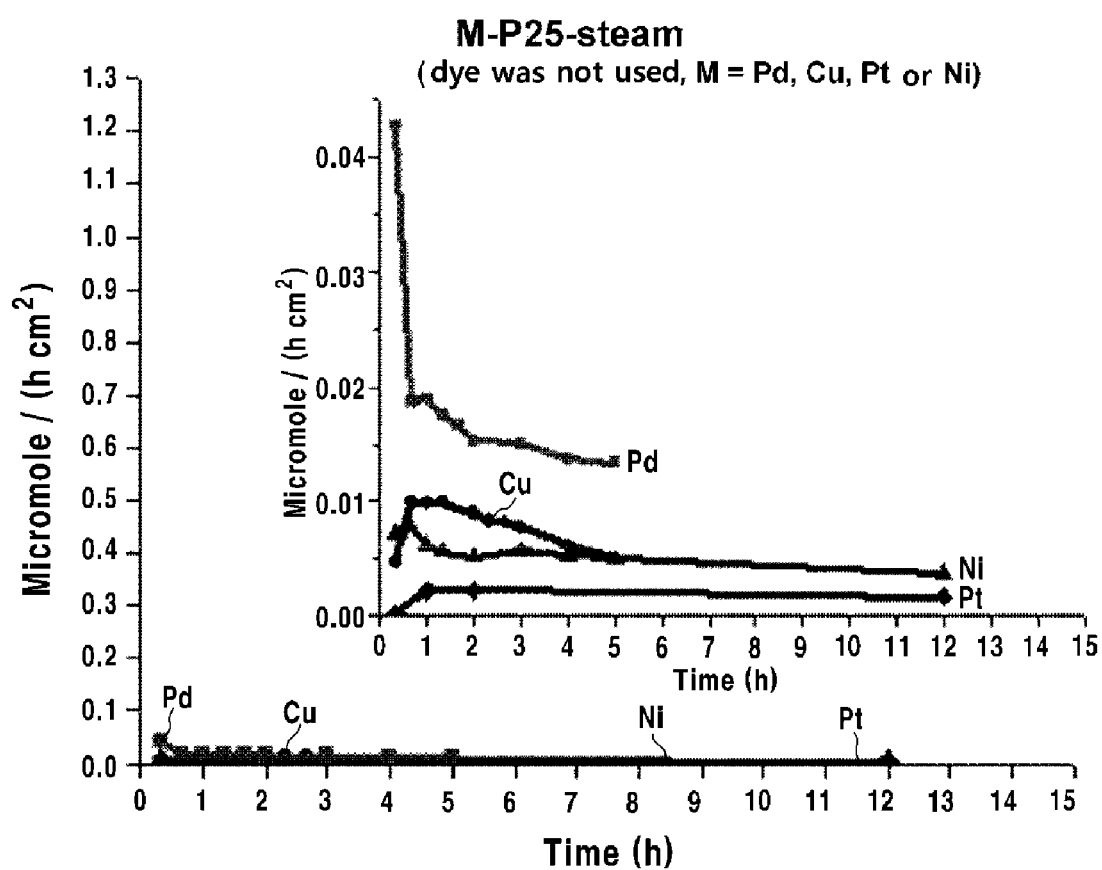
FIG. 8 provides a graph showing a production rate of a methane gas in a product of a carbon dioxide reduction reaction by a composite catalyst in accordance with an example of the present disclosure.
Figure 9:
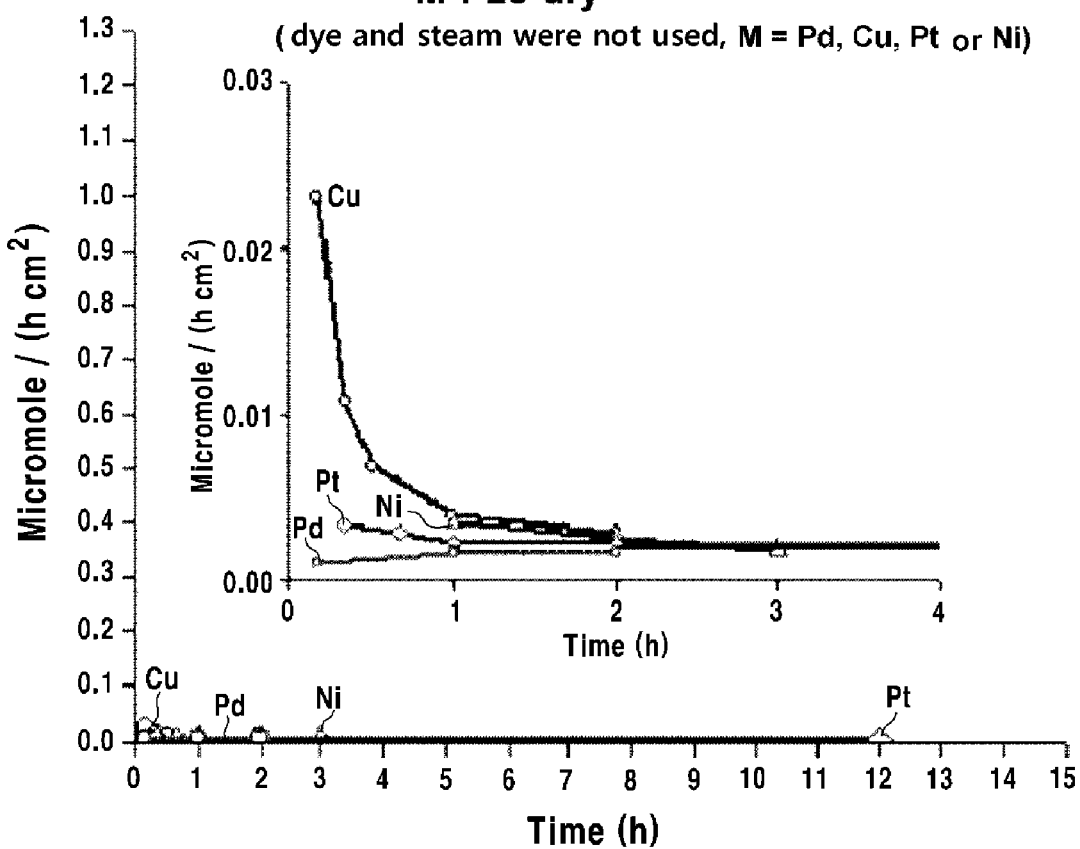
FIG. 9 provides a graph showing a production rate of a methane gas in a product of a carbon dioxide reduction reaction by a composite catalyst in accordance with an example of the present disclosure.
Figure 10:
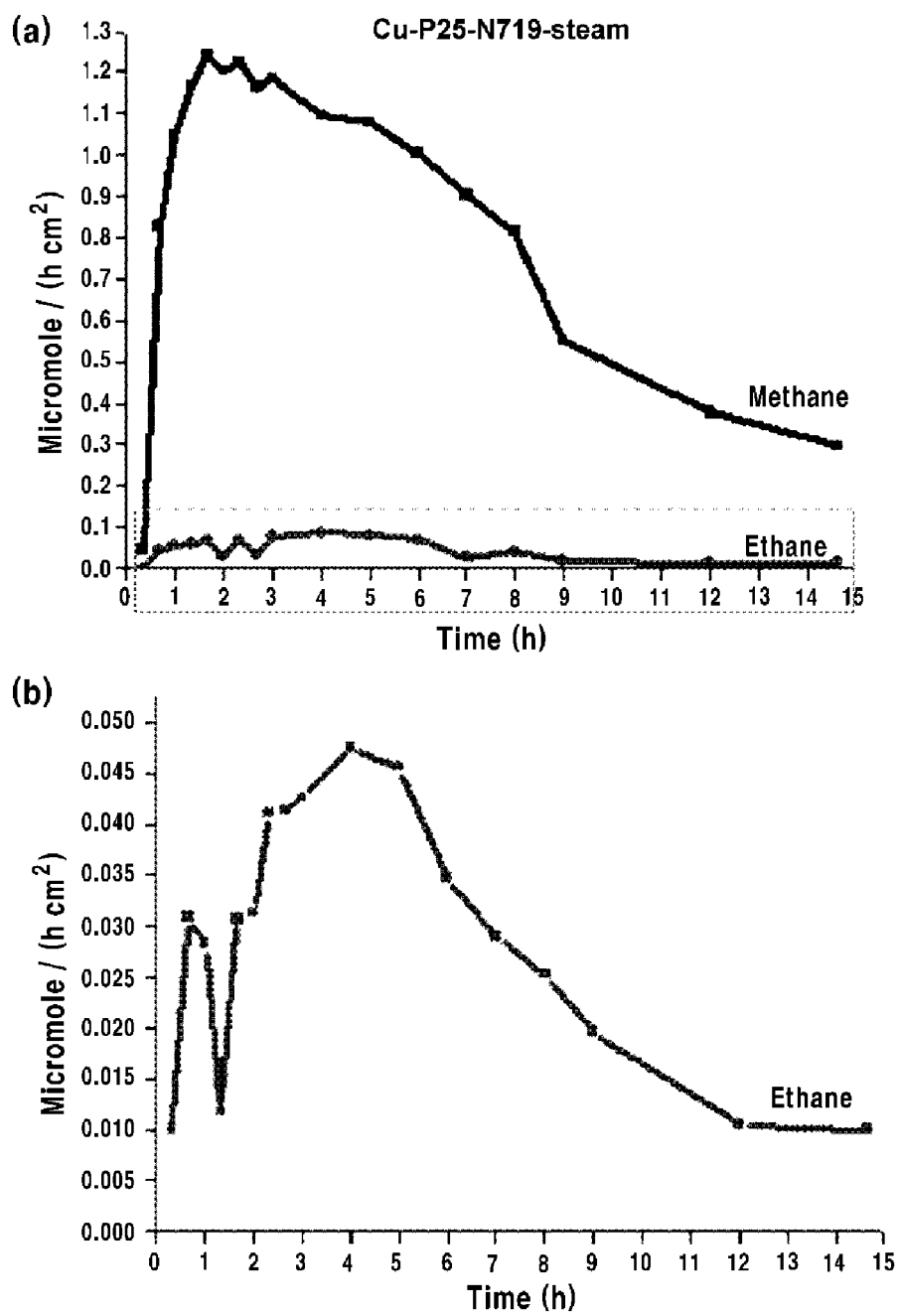
FIG. 10 provides a graph showing a production rate of methane and ethane in a product of a carbon dioxide reduction reaction by a composite catalyst in accordance with an example of the present disclosure.

In accordance with an illustrative embodiment of the present disclosure, the composite catalyst may include the same form as illustrated in FIGS. 3 and 4, but may not be limited thereto.

In accordance with an illustrative embodiment of the present disclosure, an amount of the water further contained in the gas containing the hydrogen gas and the carbon dioxide gas to be injected into the reactor may be from more than about 0 ppm to about 100 ppm or less based on a total volume of the hydrogen gas and the carbon dioxide gas to be injected into the reactor, but may not be limited thereto. For example, an amount of the water further contained in the gas containing the hydrogen gas and the carbon dioxide gas to be injected into the reactor may be from more than about 0 ppm to about 100 ppm or less, from about 10 ppm or more to about 100 or less, from about 20 ppm or more to about 100 ppm or less, from about 30 ppm or more to about 100 ppm or less, from about 40 ppm or more to about 100 ppm or less, from about 50 ppm or more to about 100 ppm or less, from about 60 ppm or more to about 100 ppm or less, about 70 ppm or more to about 100 ppm or less, from about 80 ppm or more to about 100 ppm or less, from about 90 ppm or more to about 100 ppm or less, from more than about 0 ppm to about 90 ppm or less, from more than about 0 ppm to about 80 ppm or less, from more than about 0 ppm to about 70 ppm or less, from more than about 0 ppm to about 60 ppm or less, from more than about 0 ppm to about 50 or less, from more than about 0 ppm to about 40 ppm or less, from more than about 0 ppm to about 30 ppm or less, from more than about 0 ppm to about 20 ppm or less, or from more than about 0 ppm to about 10 ppm or less, based on a total volume of the hydrogen gas and the carbon dioxide gas to be injected into the reactor, but may not be limited thereto.

In accordance with an illustrative embodiment of the present disclosure, the water further contained in the gas containing the hydrogen gas and the carbon dioxide gas to be injected into the reactor may be included in a gas mixture of the hydrogen gas and the carbon dioxide gas containing water, which is obtained by bubbling the hydrogen gas and the carbon dioxide gas into water before injecting the hydrogen gas and the carbon dioxide gas into the reactor.

In accordance with an illustrative embodiment of the present disclosure, the water further contained in the gas containing the hydrogen gas and the carbon dioxide gas to be injected into the reactor may be injected in the manner that the water is sprayed into the reactor, or in a form of steam, but may not be limited thereto.

In accordance with an illustrative embodiment of the present disclosure, the hydrogen gas and the carbon dioxide gas, which are injected into the reactor, may be each independently supplied or may be mixed in advance to be supplied, but may not be limited thereto.

In accordance with an illustrative embodiment of the present disclosure, the hydrogen gas may be supplied from a water decomposition reactor into the reactor, but may not be limited thereto.

In accordance with an illustrative embodiment of the present disclosure, the water decomposition reactor includes a photocatalyst for water decomposition to produce oxygen and hydrogen through water decomposition under sunlight irradiation. The produced oxygen may be removed, and the produced hydrogen may be supplied to the reactor. However, the present disclosure may not be limited thereto.

In accordance with an illustrative embodiment of the present disclosure, a temperature of the reactor may be formed by the sunlight irradiation, but may not be limited thereto. For example, the temperature of the reactor may be about 25° C. to about 100° C., but may not be limited thereto. For example, the temperature of the reactor may be from about 25° C. to about 100° C., from about 30° C. to about 100° C., from about 40° C. to about 100° C., from about 50° C. to about 100° C., from about 60° C. to about 100° C., from about 70° C. to about 100° C., from about 75° C. to about 100° C., from about 80° C. to about 100° C., from about 90° C. to about 100° C., from about 25° C. to about 90° C., from about 25° C. to about 80° C., from about 25° C. to about 75° C., from about 25° C. to about 70° C., from about 25° C. to about 60° C., from about 25° C. to about 50° C., from about 25° C. to about 40° C., from about 25° C. to about 30° C., from about 30° C. to about 75° C., or from about 50° C. to about 75° C., but may not be limited thereto.

In accordance with an illustrative embodiment of the present disclosure, the temperature of the reactor may be controlled from the temperature formed by the sunlight irradiation through additional heating or cooling, but may not be limited thereto.

In accordance with an illustrative embodiment of the present disclosure, a pressure of the reactor may be formed by the hydrogen gas and the carbon dioxide gas to be injected, but may not be limited thereto. For example, the pressure of the reactor may be an atmospheric pressure, less than an atmospheric pressure, or higher than an atmospheric pressure, but may not be limited thereto.

In accordance with an illustrative embodiment of the present disclosure, a pressure of the reactor may be additionally increased from the pressure formed by the hydrogen gas and the carbon dioxide gas by a pressure controller, but may not be limited thereto.

In accordance with an illustrative embodiment of the present disclosure, the composite catalyst may have a form, in which a particle of the metal and the photosensitizer are coated on a surface of a support containing the metal compound, but may not be limited thereto.

In accordance with an illustrative embodiment of the present disclosure, the particle of the metal may have a size of a nanometer unit, but may not be limited thereto. For example, the particle of the metal may have a size of about 0.5 nm to about 100 nm, but may not be limited thereto. For example, the particle of the metal may have a size of from about 0.5 nm to 100 nm, from about 1 nm to about 100 nm, from about 5 nm to about 100 nm, from about 10 nm to about 100 nm, from about 20 nm to about 100 nm, from about 25 nm to about 100 nm, from about 35 nm to about 100 nm, from about 50 nm to about 100 nm, from about 75 nm to about 100 nm, from about 0.5 nm to about 75 nm, from about 0.5 nm to about 50 nm, from about 0.5 nm to about 35 nm, from about 0.5 nm to about 25 nm, from about 0.5 nm to about 20 nm, about 0.5 nm to about 10 nm, from about 0.5 nm to about 5 nm, from about 0.5 nm to about 1 nm, from about 20 nm to about 25 nm, from about 10 nm to about 25 nm, or from about 5 nm to about 25 nm, but may not be limited thereto.

In accordance with an illustrative embodiment of the present disclosure, the metal may include a member selected from the group consisting of Fe, Ru, Rh, Co, Ir, Os, Pt, Pd, Ni, Au, Ag, Cu, Co, Zn, Ti, V, Mn, Sn, In, Pb, Cd, Ga and combinations thereof, but may not be limited thereto.

In accordance with an illustrative embodiment of the present disclosure, the support may have a form of a particle, a mesoporous structure, a rod, a fiber, or a tube, having a size of from a nanometer unit to a micrometer unit.

In accordance with an illustrative embodiment of the present disclosure, the support containing the metal compound may have a pore in a nanometer unit, but may not be limited thereto.

In accordance with an illustrative embodiment of the present disclosure, the metal compound may include a member selected from the group consisting of a metal oxide, a metal carbide, a metal oxycarbide and combinations thereof, but may not be limited thereto.

For example, the metal oxide may include an oxide containing one or more metals selected from the group consisting of a transition metal, a non-transition metal and combinations thereof; or the metal oxide may include a metal oxide doped with a member selected from the group consisting of a non-metallic element, an alkali metal, alkaline earth metal and combinations thereof, but may not be limited thereto. For example, the metal oxide may be a metal oxide, which absorbs light of a region including visible light, ultraviolet light, infrared light or combinations thereof, but may not be limited thereto. Non-limiting examples for the metal oxide may include a member selected from the group consisting of $TiO_2$, $ZnO$, $Ta_2O_5$, $ZrO_2$, $WO_3$, iron oxide, manganese oxide, copper oxide, cobalt oxide, nickel oxide, chrome oxide, molybdenum oxide, vanadium oxide, indium oxide, lead oxide, $ZnCrO_4$, $ZnFe_2O_4$, $MnTiO_3$, $CaTiO_3$, $BaTiO_3$, $SrTiO_3$, $BiVO_4$, $Pb_4Ti_3$, $CdIn_2O_4$, $Fe_2TiO_5$, $CrNbO_4$ and $Cr_2Ti_2O_7$; the metal oxide doped with N, P, As, C, Y, V, Mo, Cr, Cu, Al, Ta, B, Ru, Mn, Fe, Li, Nb, In, Pb, Ge, C, N, S, Sb or combinations thereof; and combinations thereof, but may not be limited thereto.

For example, the metal carbide may include SiC or a carbide of a transition metal, but may not be limited thereto. For example, the metaloxycarbide may include SiOC or an oxycarbide of a transition metal, but may not be limited thereto.

In accordance with an illustrative embodiment of the present disclosure, the photosensitizer may absorb light of a region including visible light, but may not be limited thereto.

For example, the photosensitizer may be a compound, which absorbs light of a region including visible light and includes a linker containing a functional group selected from the group consisting of —$CO_2H$, —$PO_3H$, —$NH_2$, and combinations thereof, but may not be limited thereto.

For example, the photosensitizer may be a compound, which absorbs light of a region including visible light and does not include a linker containing a functional group selected from the group consisting of —$CO_2H$, —$PO_3H$, —$NH_2$, and combinations thereof, but may not be limited thereto.

In accordance with an illustrative embodiment of the present disclosure, if the photosensitizer is a compound, which absorbs light of a region including visible light and does not include a linker containing a functional group selected from the group consisting of —$CO_2H$, —$PO_3H$, —$NH_2$, and combinations thereof, the photosensitizer may have a cation or anion form, but may not be limited thereto. In this case, the composite catalyst may have a form, in which the particle of the metal is coated on a surface of a support containing the metal oxide, and the photosensitizer in the anion form mixed in a cationic polymer or the photosensitizer in a cation form mixed in an anionic polymer is coated between the particles of the metal, but may not be limited thereto. For example, the cationic polymer may include a member selected from the group consisting of polylysine, dendrimer, linear polyethyleneimine, branched polyethylene imine, chitosan, diethylaminoethyl (DEAE)-dextran, and polydimethylaminoethylmethacrylate (pDMAEMA), but may not be limited thereto. For example, the anionic polymer may include a member selected from the group consisting of nafion, polystyrene sulfonate, sodium carboxymethylcellulose, sodium carboxy methyl guar, sodium alginate, sodium polypectate, and poly(sodium-2-acrylamide-2-methylpropane sulfo-nate), but may not be limited thereto.

As shown in FIG. 4(a), the composite catalyst may be formed in the manner that the particle of the metal 200 and the cationic photosensitizer 320, which is mixed in the anionic polymer 410 and does not include a linker, are coated on a surface of a support containing the metal compound 100. In addition, as shown in FIG. 4(b), the composite catalyst may be formed in the manner that the particle of the metal 200 and the anionic phososensitizer 330, which is mixed in the cationic polymer 420 and does not include a linker, are coated on a surface of a support containing the metal compound 100.

In accordance with an illustrative embodiment of the present disclosure, the photosensitizer may absorb light of a region including visible light, but may not be limited thereto. For example, the photosensitive may include a member selected from the group consisting of a dye absorbing visible light, metal sulfide, a metal oxide absorbing visible light, fullerol, a graphene oxide, and combinations thereof, but may not be limited thereto.

In accordance with an illustrative embodiment of the present disclosure, the photosensitizer may include a cationic or anionic compound, which absorbs light of a region including visible light and does not include a linker containing a functional group selected from the group consisting of $CO_2H$, —$PO_3H$, —$NH_2$ or combinations thereof, but may not be limited thereto.

In accordance with an illustrative embodiment of the present disclosure, a product containing a hydrocarbon may be obtained by reacting the hydrogen gas with the carbon dioxide gas through the reducing method of carbon dioxide using sunlight and hydrogen, but may not be limited thereto. For example, the hydrocarbon may include a member selected from the group consisting of methane, ethane, propane, butane, pentane, hexane, heptanes, octane, methanol, ethanol, propanol, butanol, pentanol, hexanol, heptanol, octanol, and combinations thereof, but may not be limited thereto.

The second aspect of the present disclosure may provide an reaction apparatus for reducing carbon dioxide using sunlight and hydrogen, which includes: a reactor including a light transmission member on at least one side; and a hydrogen gas supplying member, a carbon dioxide gas supplying member, and a product outlet member which are connected to the reactor, wherein hydrogen gas is supplied to the reactor through the hydrogen gas supplying member, carbon dioxide gas is supplied to the reactor through the carbon dioxide gas supplying member, and sunlight is irradiated to the reactor through the light transmission member in the presence of a composite catalyst containing a metal, a metal compound, and a photosensitizer loaded into the reactor so that the hydrogen gas and the carbon dioxide gas are reacted.

In accordance with an illustrative embodiment of the present disclosure, the metal compound may include a member selected from the group consisting of a metal oxide, a metal carbide, a metal oxycarbide, and combinations thereof, but may not be limited thereto.

In accordance with an illustrative embodiment of the present disclosure, the reaction apparatus for reducing carbon dioxide using sunlight and hydrogen may further include a water supplying member connected to the reactor, but may not be limited thereto.

In accordance with an illustrative embodiment of the present disclosure, wherein the water supplying member may spray water into the reactor or supply water in a form of steam into the reactor.

In accordance with an illustrative embodiment of the present disclosure, the hydrogen gas supplying member is connected to an apparatus for water decomposition reaction, but may not be limited thereto.

In accordance with an illustrative embodiment of the present disclosure, the light transmission member may be formed on at least one surface of a top surface, a bottom surface and side surfaces of the reactor, but may not be limited thereto.

In accordance with an illustrative embodiment of the present disclosure, the light transmission member may be formed including glass, quartz, fused silica or transparent plastic, but may not be limited thereto.

In accordance with an illustrative embodiment of the present disclosure, the apparatus for water decomposition reaction includes a water decomposition reactor and a separating member connected to the water decomposition reactor, and the separating member includes an oxygen outlet member and a hydrogen outlet member, and the hydrogen outlet member may be connected to the hydrogen gas supplying member.

In accordance with an illustrative embodiment of the present disclosure, the water decomposition reactor may include a photocatalyst for oxidation reaction of water, but may not be limited thereto. For example, the photocatalyst for oxidation reaction of water may include support particles and photocatalyst particles for oxidation reaction of water, which are deposited on a surface of the support particles, but may not be limited thereto. As the photocatalyst for oxidation reaction of water, any catalyst material, which is known in the art of the present disclosure and has oxidizing activity of water under light irradiation, may be used without limitation. For example, among catalyst materials, which are known as the photocatalyst for oxidation reaction of water and have oxidizing activity of water under light irradiation, a catalyst material, which has oxidizing activity of water under irradiation of light including a member selected from visible light, violet light, infrared light and combinations thereof, may be used, but may not be limited thereto. In an illustrative embodiment, the photocatalyst for oxidation reaction of water may include a photoactive material, but may not be limited thereto. For example, the photoactive material may include a semiconductor. The semiconductor needs to meet the condition that an electron of a conduction band of the semiconductor is transferred to the second structure, and a positive hole of a valence band of the semiconductor has a potential capable of oxidizing water and generating oxygen and is stable during a reaction. For example, the photoactive material may include a p-type semiconductor. Non-limiting examples for the p-type semiconductor may include $TiO_2$, ZnO, $SrTiO_3$, $Ta_2O_5$, $ZrO_2$, $WO_3$, $BiVO_4$, $Pb_4Ti_3$, $CdIn_2O_4$, $Fe_2TiO_5$, $CrNbO_4$, $Cr_2Ti_2O_7$, CdS, $MoS_2$, CdTe, CdZnTe, ZnTe, HgTe, HgZnTe, HgSe, and combinations thereof. In addition, $TiO_2$ may be doped with a member selected from the group consisting of Y, V, Mo, Cr, Cu, Al, Ta, B, Ru, Mn, Fe, Li, Nb, In, Pb, Ge, C, N, S, Sb and combinations thereof, but may not be limited thereto. In an illustrative embodiment, the photocatalyst for oxidation reaction of water may further include a photosensitive material, in addition to the photoactive material, but may not be limited thereto. Non-limiting examples for the photosensitive material may include an organic dye, a metal complex dye, or a quantum, which is known in the art, but may not be limited thereto.

Hereinafter, the present disclosure is described in more detail with reference to examples, but is not limited to the examples.

EXAMPLES

A composite catalyst, in which a 1 wt % metal (Ni, Pt, Pd, Cu or Ru) and a N719 Ru-dye are loaded on a $TiO_2$ anatase nanoparticle support and a $TiO_2$ (P25, Degussa) nanoparticle support, respectively, was prepared as described below, and then, carbon dioxide reduction experiments were conducted by using the composite catalyst.

Example 1

Preparation of a Pd (1 wt %)/N719 Dye/$TiO_2$ (Anatase) Composite Catalyst and a $CO_2$ Reduction Experiment First, 2 g of $TiO_2$ anatase nano-particles (size <25 nm), which was purchased from Aldrich, was dispersed in 10 mL water, and then, 0.0355 g $PdCl_2$ (containing 0.02 g Pd) was added thereto. A 10 mL $NH_4OH$ (28%) aqueous solution was added to the mixture solution, and then, the mixture solution was stirred for 3 hours. Thereafter, the water contained as a solvent in the solution was vaporized by using a rotary evaporator. The obtained $TiO_2$ nano-particles, which were dried and doped with $Pd(NH_3)_4Cl_2$, were sintered at 350° C. for 3 hours by using a tube-type furnace, and then, cooled to a room temperature. 0.5 g of the obtained $PdO/TiO_2$ was put into a solution, in which a 1 mg N719 Ru-dye is dissolved in a 5 mL acetonitrile solvent, and stirred for 1 hour. 0.5 g of the obtained $PdO/N719/TiO_2$ was placed in a reactor and reduced at 75° C. for 1 hour by passing a hydrogen gas at a velocity of 50 mL/min through the reactor so that a composite catalyst containing Pd (1 wt %)/N719/$TiO_2$ was prepared directly in the reactor.

Thereafter, a reaction was conducted by simultaneously injecting a $H_2$ gas (4.5 mL/min) and a $CO_2$ gas (1.5 mL/min) into the reactor. In order to cause a photoreaction upon the reaction, 74 mW/cm² simulated sunlight was irradiated to the reactor. When water (moisture or steam) is further injected to the reactor, a $H_2$/$CO_2$ mixture gas was injected into the reactor after passing through a tube (bubbler) containing water. A temperature of the tube (bubbler) containing water was constantly maintained at 30° C. A temperature of the reactor was consistently maintained at 50° C. A product was obtained from the reactor, and a production rate of a methane gas in the product was measured by a gas chromatography-mass spectrometry (GC-MS), so that the results described below were obtained. FIGS. 5A to 5D provide graphs showing variation in the production rate of the methane gas depending on the reaction time and the reaction condition. According to the measurement results, very small products were obtained when the dye and/or the steam were not used.

<Production Rate of the Methane Gas in the Product>
(1) Pd (1 wt %)/$TiO_2$ (anatase)/dry:
0.3 µmol/(cm² h) after 0.5 hour
0.0 µmol/(cm² h) after 24 hours
(2) Pd (1 wt %)/$TiO_2$ (anatase)/steam:
0.3 µmol/(cm² h) after 0.5 hour
0.1 µmol/(cm² h) after 24 hours
(3) Pd (1 wt %)/N719/$TiO_2$ (anatase)/dry:
0.35 µmol/(cm² h) after 0.5 hour (maximum rate)
0.1 µmol/(cm² h) after 10 hours
(4) Pd (1 wt %)/N719/$TiO_2$ (anatase)/steam:
0.58 µmol/(cm² h) after 1 hour (maximum rate)
0.3 µmol/(cm² h) after 10 hours Example 2

Preparation of a Cu (1 wt %)/N719 Dye/$TiO_2$ (Anatase) Composite Catalyst and a $CO_2$ Reduction Experiment The Cu (1 wt %)/N719 dye/$TiO_2$ composite catalyst was prepared in the same method as described in Example 1, except for using 0.0885 g $Cu(OAC)_2$ (containing 0.02 g Cu), and then, a $CO_2$ reduction experiment was conducted by using the composite catalyst. A product was obtained from the reactor according to the reaction time, and a production rate of a methane gas in the product was measured by GC-MS, so that the results described below were obtained. FIGS. 5A to 5D provide graphs showing variation in the production rate of the methane gas depending on the reaction time and the reaction condition. According to the measurement results, very small products were obtained when the dye and/or the steam were not used.

<Production Rate of the Methane Gas in the Product>
(1) Cu (1 wt %)/$TiO_2$ (anatase)/dry:
0.001 µmol/(cm² h) or less after 1 hour
0.001 µmol/(cm² h) or less after 24 hours
(2) Cu (1 wt %)/$TiO_2$ (anatase)/steam:
0.001 µmol/(cm² h) or less after 1 hour
0.001 µmol/(cm² h) or less after 24 hours
(3) Cu (1 wt %)/N719/$TiO_2$ (anatase)/dry:
0.4 µmol/(cm² h) after 3 hours (maximum rate)
0.05 µmol/(cm² h) after 7 hours
(4) Cu (1 wt %)/N719/$TiO_2$ (anatase)/steam:
0.6 µmol/(cm² h) after 5 hours (maximum rate)
0.4 µmol/(cm² h) after 16 hours

Example 3

Preparation of a Ni (1 wt %)/N719 Dye/TiO$_2$ (P25) Composite Catalyst and a CO$_2$ Reduction Experiment The Ni (1 wt %)/N719 dye/TiO$_2$ (P25) composite catalyst was prepared in the same method as described in Example 1, except for using 0.0883 g Ni(OAC)$_2$ (containing 0.02 g Ni), and then, a CO$_2$ reduction experiment was conducted by using the composite catalyst. A product was obtained from the reactor according to the reaction time, and a production rate of a methane gas in the product was measured by GC-MS, so that the results described below were obtained. FIGS. 5A to 5D provide graphs showing variation in the production rate of the methane gas depending on the reaction time and the reaction condition. According to the measurement results, very small products were obtained when the dye and/or the steam were not used.

<Production Rate of the Methane Gas in the Product>
(1) Ni (1 wt %)/TiO$_2$ (anatase)/dry:
0.000 μmol/(cm$^2$ h) after 1 hour
0.000 μmol/(cm$^2$ h) after 10 hours
(2) Ni (1 wt %)/TiO$_2$ (anatase)/steam:
0.002 μmol/(cm$^2$ h) after 1 hour
0.001 μmol/(cm$^2$ h) after 10 hours
(3) Ni (1 wt %)/N719/TiO$_2$ (anatase)/dry:
0.018 μmol/(cm$^2$ h) after 1 hour (maximum rate)
0.007 μmol/(cm$^2$ h) after 10 hours
(4) Ni (1 wt %)/N719/TiO$_2$ (anatase)/steam:
0.002 μmol/(cm$^2$ h) after 1 hour (maximum rate)
0.015 μmol/(cm$^2$ h) after 10 hours

Example 4

Preparation of a Pt (1 wt %)/N719 Dye/TiO$_2$ (Anatase) Composite Catalyst and a CO$_2$ Reduction Experiment The Pt (1 wt %)/N719 dye/TiO$_2$ composite catalyst was prepared in the same method as described in Example 1, except for using 0.0316 g Pt(NH$_3$)$_4$Cl$_2$ (containing 0.02 g Pt), and then, a CO$_2$ reduction experiment was conducted by using the composite catalyst. A product was obtained from the reactor according to the reaction time, and a production rate of a methane gas in the product was measured by GC-MS, so that the results described below were obtained. FIGS. 5A to 5D provide graphs showing variation in the production rate of the methane gas depending on the reaction time and the reaction condition. According to the measurement results, very small products were obtained when the dye and/or the steam were not used.

<Production Rate of the Methane Gas in the Product>
(1) Pt (1 wt %)/TiO$_2$ (anatase)/dry:
0.000 μmol/(cm$^2$ h) after 1 hour
0.000 μmol/(cm$^2$ h) after 16 hours
(2) Pt (1 wt %)/TiO$_2$ (anatase)/steam:
0.002 μmol/(cm$^2$ h) after 3 hours
0.001 μmol/(cm$^2$ h) after 16 hours
(3) Pt (1 wt %)/N719/TiO$_2$ (anatase)/dry:
0.12 μmol/(cm$^2$ h) after 0.5 hour (maximum rate)
0.04 μmol/(cm$^2$ h) after 16 hours
(4) Pt (1 wt %)/N719/TiO$_2$ (anatase)/steam:
0.2 μmol/(cm$^2$ h) after 1 hour (maximum rate)
0.13 μmol/(cm$^2$ h) after 16 hours

Example 5

Preparation of a Ru (1 wt %)/N719 Dye/TiO$_2$ (Anatase) Composite Catalyst and a CO$_2$ Reduction Experiment The Ru (1 wt %)/N719 dye/TiO$_2$ composite catalyst was prepared in the same method as described in Example 1, except for using 0.041 g RuCl$_3$ (containing 0.02 g Ru), and then, a CO$_2$ reduction experiment was conducted by using the composite catalyst. A product was obtained from the reactor according to the reaction time, and a production rate of a methane gas in the product was measured by GC-MS, so that the results described below were obtained. Very small products were obtained when the dye and/or the steam were not used.

<Production Rate of the Methane Gas in the Product>
(1) Ru (1 wt %)/TiO$_2$ (anatase)/dry:
0.3 μmol/(cm$^2$ h) after 0.5 hour
0.2 μmol/(cm$^2$ h) after 24 hours
(2) Ru (1 wt %)/TiO$_2$ (anatase)/steam:
0.3 μmol/(cm$^2$ h) after 0.5 hour
0.3 μmol/(cm$^2$ h) after 24 hours
(3) Ru (1 wt %)/N719/TiO$_2$ (anatase)/dry:
1.01 μmol/(cm$^2$ h) after 0.5 hour (maximum rate)
0.82 μmol/(cm$^2$ h) after 10 hours
(4) Ru (1 wt %)/N719/TiO$_2$ (anatase)/steam:
1.28 μmol/(cm$^2$ h) after 1 hour (maximum rate)
1.03 μmol/(cm$^2$ h) after 10 hours

Example 6

Preparation of a Pd (1 wt %)/N719 Dye/TiO$_2$ (Anatase) Composite Catalyst and a CO$_2$ Reduction Experiment The Pd (1 wt %)/N719 dye/TiO$_2$ composite catalyst was prepared in the same method as described in Example 1, except for using 2 g TiO$_2$ (P25) purchased from Aldrich, and then, a CO$_2$ reduction experiment was conducted by using the composite catalyst. A product was obtained from the reactor according to the reaction time, and a production rate of a methane gas in the product was measured by GC-MS, so that the results described below were obtained. FIGS. 6 to 9 provide graphs showing variation in the production rate of the methane gas depending on the reaction time and the reaction condition. Very small products were obtained when the dye and/or the steam were not used.

<Production Rate of the Methane Gas in the Product>
(1) Pd (1 wt %)/TiO$_2$ (P25)/dry:
0.003 μmol/(cm$^2$ h) after 1 hour
0.003 μmol/(cm$^2$ h) after 3 hours
(2) Pd (1 wt %)/TiO$_2$ (P25)/steam:
0.02 μmol/(cm$^2$ h) after 1 hour
0.015 μmol/(cm$^2$ h) after 5 hours
(3) Pd (1 wt %)/N719/TiO$_2$ (P25)/dry:
0.05 μmol/(cm$^2$ h) after 1 hour (maximum rate)
0.01 μmol/(cm$^2$ h) after 6 hours
(4) Pd (1 wt %)/N719/TiO$_2$ (P25)/steam:
0.35 μmol/(cm$^2$ h) after 1 hour (maximum rate)
0.1 μmol/(cm$^2$ h) after 10 hours

Example 7

Preparation of a Cu (1 wt %)/N719 Dye/TiO$_2$ (P25) Composite Catalyst and a CO$_2$ Reduction Experiment The Cu (1 wt %)/N719 dye/TiO$_2$ (P25) composite catalyst was prepared in the same method as described in Example 1, except for using 0.0885 g Cu(OAC)$_2$ (containing 0.02 g Cu) and 2 g TiO$_2$ (P25), and then, a CO$_2$ reduction experiment was conducted by using the composite catalyst. A product was obtained from the reactor according to the reaction time, and a production rate of a methane gas in the product was measured by GC-MS so that the results described below were obtained. FIGS. 6 to 9 provide graphs showing variation in the production rate of the methane gas depending on the reaction time and the reaction condition. Very small products were obtained when the dye and/or the steam were not used.

<Production Rate of the Methane Gas in the Product>
(1) Cu (1 wt %)/TiO$_2$ (P25)/dry:
0.005 μmol/(cm$^2$ h) after 1 hour
0.003 μmol/(cm$^2$ h) or less after 2 hours
(2) Cu (1 wt %)/TiO$_2$ (P25)/steam:
0.01 μmol/(cm$^2$ h) after 1 hour
0.005 μmol/(cm$^2$ h) or less after 5 hours
(3) Cu (1 wt %)/N719/TiO$_2$ (P25)/dry:
0.15 μmol/(cm$^2$ h) after 1 hour (maximum rate)
0.04 μmol/(cm$^2$ h) after 10 hours
(4) Cu (1 wt %)/N719/TiO$_2$ (P25)/steam:
(Methane)
1.0 μmol/(cm$^2$ h) after 1 hour (maximum rate)
0.6 μmol/(cm$^2$ h) after 10 hours
(Ethane)
0.03 μmol/(cm$^2$ h) after 1 hour (maximum rate)
0.02 μmol/(cm$^2$ h) after 10 hours
(Methanol)
0.01 μmol/(cm$^2$ h) after 1 hour (maximum rate)
0.02 μmol/(cm$^2$ h) after 5 hours

Example 8

Preparation of a Ni (1 wt %)/N719 Dye/TiO$_2$ (P25) Composite Catalyst and a CO$_2$ Reduction Experiment The Ni (1 wt %)/N719 dye/TiO$_2$ (P25) composite catalyst was prepared in the same method as described in Example 1, except for using 0.0883 g Ni(OAC)$_2$ (containing 0.02 g Ni) and 2 g TiO$_2$ (P25), and then, a CO$_2$ reduction experiment was conducted by using the composite catalyst. A product was obtained from the reactor according to the reaction time, and a production rate of a methane gas in the product was measured by GC-MS so that the results described below were obtained. FIGS. 6 to 9 provide graphs showing variation in the production rate of the methane gas depending on the reaction time and the reaction condition. Very small products were obtained when the dye and/or the steam were not used.

<Production Rate of the Methane Gas in the Product>
(1) Ni (1 wt %)/TiO$_2$ (P25)/dry:
0.003 μmol/(cm$^2$ h) after 1 hour
0.002 μmol/(cm$^2$ h) after 3 hours
(2) Ni (1 wt %)/TiO$_2$ (P25)/steam:
0.005 μmol/(cm$^2$ h) after 1 hour
0.005 μmol/(cm$^2$ h) after 5 hours
(3) Ni (1 wt %)/N719/TiO$_2$ (P25)/dry:
0.02 μmol/(cm$^2$ h) after 1 hour (maximum rate)
0.005 μmol/(cm$^2$ h) after 10 hours
(4) Ni (1 wt %)/N719/TiO$_2$ (P25)/steam:
0.02 μmol/(cm$^2$ h) after 1 hour (maximum rate)
0.01 μmol/(cm$^2$ h) after 10 hours

Example 9

Preparation of a Pt (1 wt %)/N719 Dye/TiO$_2$ (P25) Composite Catalyst and a CO$_2$ Reduction Experiment The Pt (1 wt %)/N719 dye/TiO$_2$ (P25) composite catalyst was prepared in the same method as described in Example 1, except for using 0.0316 g Pt(NH$_3$)$_4$Cl$_2$ (containing 0.02 g Pt) and 2 g TiO$_2$ (P25), and then, a CO$_2$ reduction experiment was conducted by using the composite catalyst. A product was obtained from the reactor according to the reaction time, and a production rate of a methane gas in the product was measured by GC-MS so that the results described below were obtained. FIGS. 6 to 9 provide graphs showing variation in the production rate of the methane gas depending on the reaction time and the reaction condition. Very small products were obtained when the dye and/or the steam were not used.

<Production Rate of the Methane Gas in the Product>
(1) Pt (1 wt %)/TiO$_2$ (P25)/dry:
0.002 μmol/(cm$^2$ h) after 1 hour
0.002 μmol/(cm$^2$ h) after 16 hours
(2) Pt (1 wt %)/TiO$_2$ (P25)/steam:
0.002 μmol/(cm$^2$ h) after 1 hour
0.002 μmol/(cm$^2$ h) after 5 hours
(3) Pt (1 wt %)/N719/TiO$_2$ (P25)/dry:
0.11 μmol/(cm$^2$ h) after 1 hour (maximum rate)
0.01 μmol/(cm$^2$ h) after 10 hours
(4) Pt (1 wt %)/N719/TiO$_2$ (P25)/steam:
0.1 μmol/(cm$^2$ h) after 1 hour (maximum rate)

Example 10

Preparation of a Ru (1 wt %)/N719 Dye/TiO$_2$ (P25) Composite Catalyst and a CO$_2$ Reduction Experiment The Ru (1 wt %)/N719 dye/TiO$_2$ (P25) composite catalyst was prepared in the same method as described in Example 1, except for using 0.041 g RuCl$_3$ (containing 0.02 g Ru) and 2 g TiO$_2$ (P25), and then, a CO$_2$ reduction experiment was conducted by using the composite catalyst. A product was obtained from the reactor according to the reaction time, and a production rate of a methane gas in the product was measured by GC-MS so that the results described below were obtained. Very small products were obtained when the dye and/or the steam were not used.

<Production Rate of the Methane Gas in the Product>
(1) Ru (1 wt %)/TiO$_2$ (P25)/dry:
0.3 μmol/(cm$^2$ h) after 0.5 hour
0.2 μmol/(cm$^2$ h) after 24 hours
(2) Ru (1 wt %)/TiO$_2$ (P25)/steam:
0.4 μmol/(cm$^2$ h) after 0.5 hour
0.3 μmol/(cm$^2$ h) after 24 hours
(3) Ru (1 wt %)/N719/TiO$_2$ (P25)/dry:
1.21 μmol/(cm$^2$ h) after 0.5 hour (maximum rate)
0.95 μmol/(cm$^2$ h) after 10 hours
(4) Ru (1 wt %)/N719/TiO$_2$ (P25)/steam:
1.48 μmol/(cm$^2$ h) after 1 hour (maximum rate)
1.23 μmol/(cm$^2$ h) after 10 hours

Example 11

Figure 11:
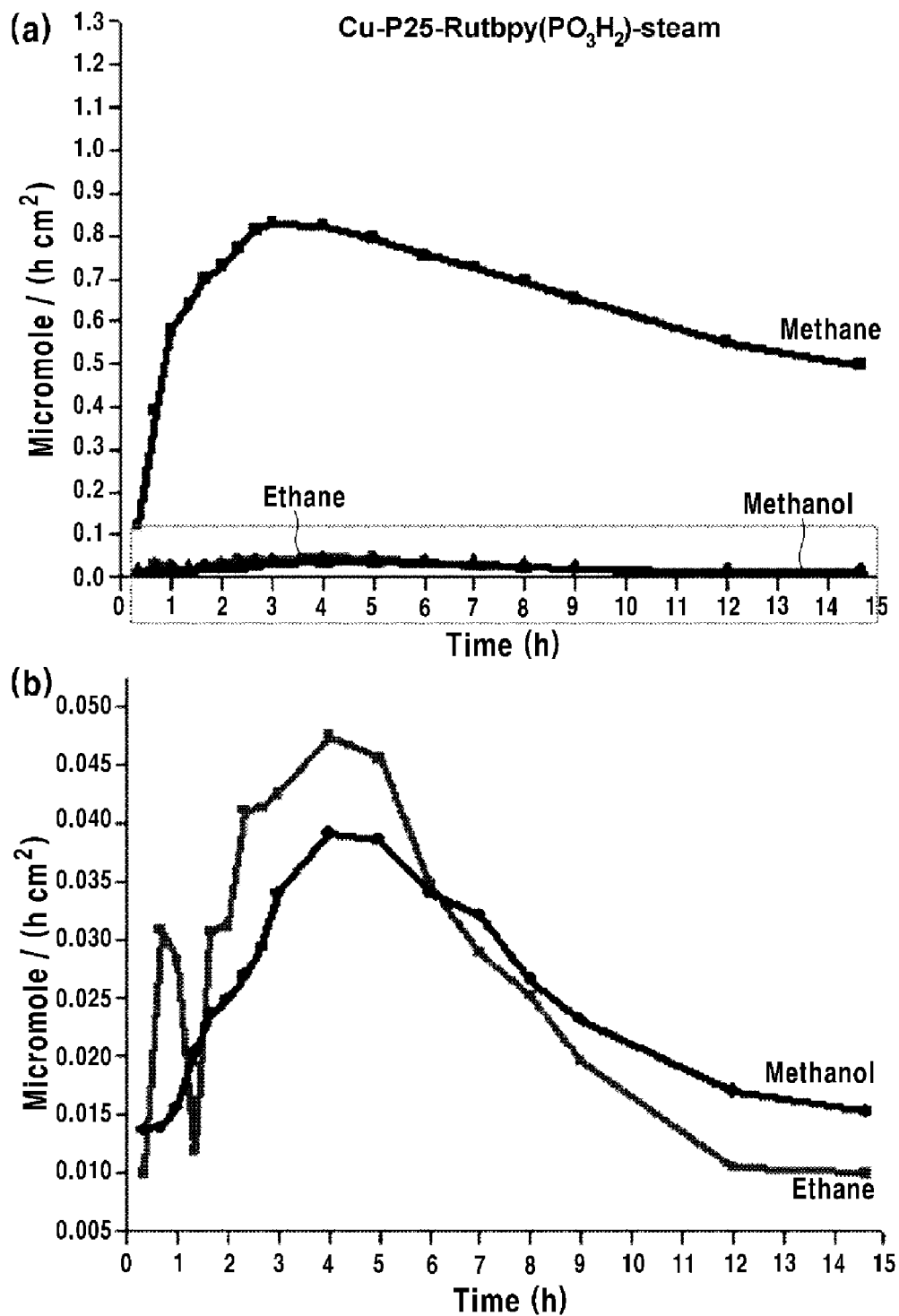
FIG. 11 provides a graph showing a production rate of methane, ethane, and methanol in a product of a carbon dioxide reduction reaction by a composite catalyst in accordance with an example of the present disclosure.

Preparation of a Cu (1 wt %)/Rutbpy(PO$_3$H$_2$) Dye/TiO$_2$ (P25) Composite Catalyst and a CO$_2$ Reduction Experiment The Cu (1 wt %)/Rutbpy(PO$_3$H$_2$) dye/TiO$_2$ (P25) composite catalyst was prepared in the same method as described in Example 7, except for using a Rutbpy(PO$_3$H$_2$) dye, and then, a CO$_2$ reduction experiment was conducted by using the composite catalyst. A product was obtained from the reactor according to the reaction time, and a production rate of methane, ethane and methanol in the product was measured by GC-MS so that the results described below were obtained. FIG. 11 provides a graph showing variation in the production rate of methane, ethane and methanol depending on the reaction time.

Example 12

Figure 12:
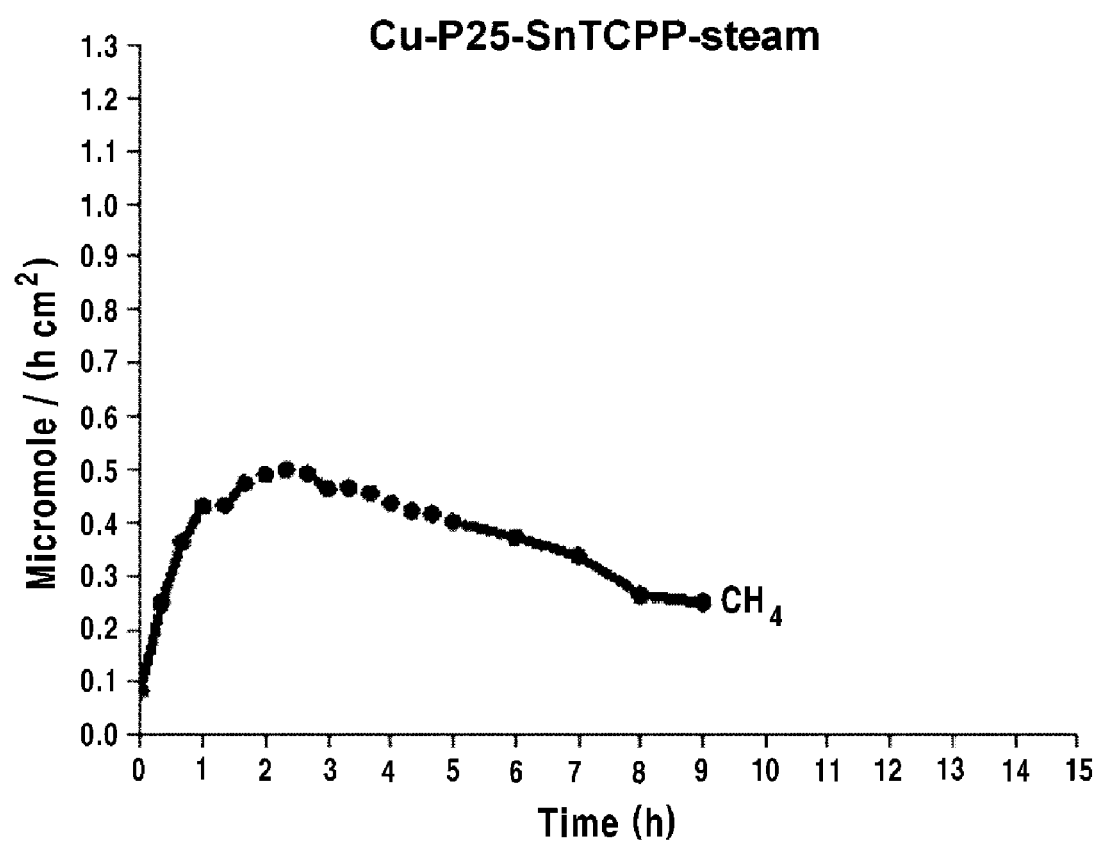
FIG. 12 provides a graph showing a production rate of a methane gas in a product of a carbon dioxide reduction reaction by a composite catalyst in accordance with an example of the present disclosure.

Preparation of a Cu (1 wt %)/SnTCPP Dye/TiO$_2$ (P25) Composite Catalyst and a CO$_2$ Reduction Experiment The Cu (1 wt %)/SnTCPP dye/TiO$_2$ (P25) composite catalyst was prepared in the same method as described in Example 7, except for using a SnTCPP dye, and then, a CO$_2$ reduction experiment was conducted by using the composite catalyst. A product was obtained from the reactor according to the reaction time, and a production rate of a methane gas in the product was measured by GC-MS so that the results described below were obtained. FIG. 12 provides a graph showing variation in the production rate of the methane gas depending on the reaction time.

Example 13

Preparation of a Pd (1 wt %)/Dye/TiO$_2$ (Anatase) Composite Catalyst and a CO$_2$ Reduction Experiment Pd (1 wt %)/dye/TiO$_2$ (anatase) composite catalysts containing three dyes of Rutbpy(PO$_3$H$_2$), SnTCPP and SnTCpp, respectively, were prepared in the same method as described in Example 1, except for using Rutbpy(PO$_3$H$_2$), SnTCPP (0.35 mg) and SnTCpp (1.0 mg) as dyes, and then, a CO$_2$ reduction experiment was conducted by using each of the composite catalysts.

Figure 13:
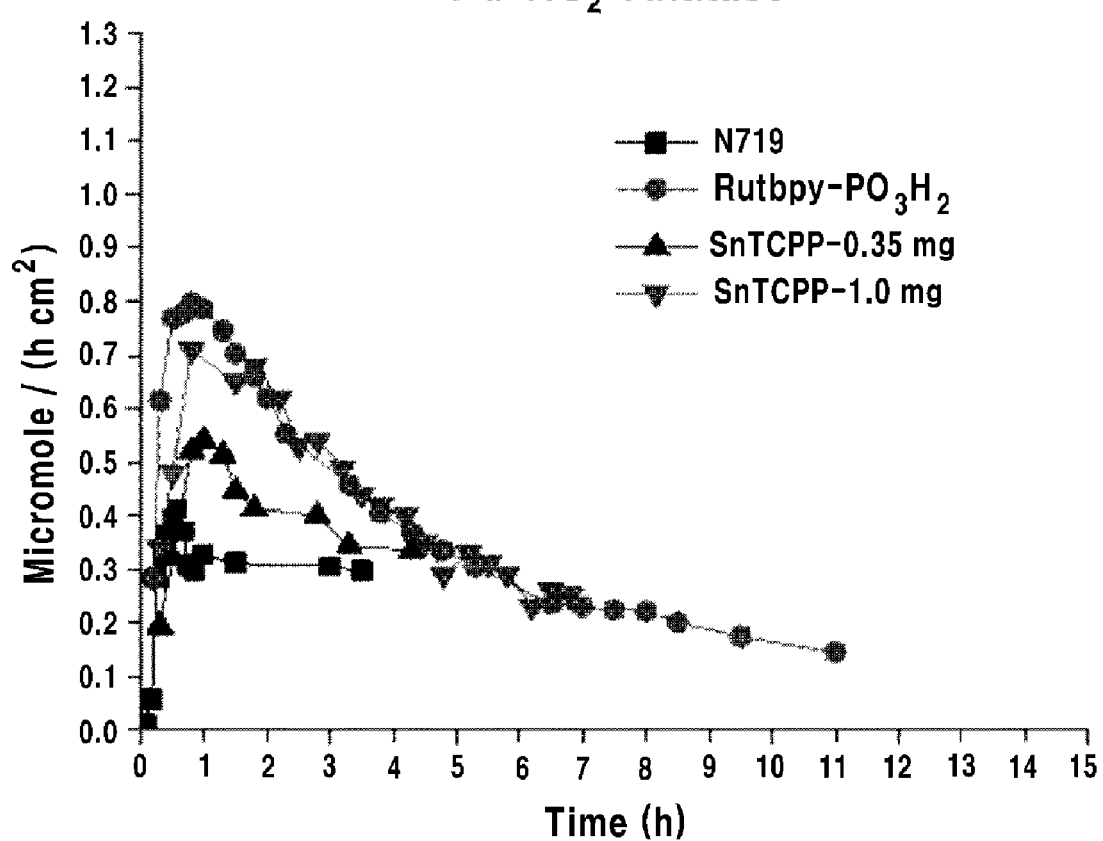
FIG. 13 provides a graph showing a production rate of a methane gas in a product of a carbon dioxide reduction reaction depending on a type of a dye contained in a composite catalyst in accordance with an example of the present disclosure.

Products were obtained from the reactor according to the reaction time, and a production rate of a methane gas in the products was measured by GC-MS so that the results described below were obtained. FIG. 13 provides a graph showing variation in the production rate of the methane gas depending on the reaction time and the types of the dyes.

The above description of the illustrative embodiments of the present disclosure is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept of the present disclosure is defined by the following claims and their equivalents rather than by the detailed description of the illustrative embodiments. It shall be understood that all modifications and embodiments conceived from the meaning and scope of the claims and their equivalents are included in the scope of the inventive concept.

100: metal compound
200: metal
300: photosensitizer
310: photosensitizer including a linker
320: cationic photosensitizer which does not include a linker
330: anionic photosensitizer which does not include a linker
410: anionic polymer
420: cationic polymer

What is claimed is:

1. A reducing method of carbon dioxide using sunlight and hydrogen, comprising:
loading a composite catalyst containing a metal, a metal compound, and a photosensitizer into a reactor;
injecting a gas containing hydrogen gas and carbon dioxide gas into the reactor to react the hydrogen gas with the carbon dioxide gas under sunlight irradiation.

2. The reducing method of carbon dioxide using sunlight and hydrogen of claim 1, wherein the metal compound includes a member selected from the group consisting of a metal oxide, a metal carbide, a metal oxycarbide, and combinations thereof.

3. The reducing method of carbon dioxide using sunlight and hydrogen of claim 1, wherein the gas containing hydrogen gas and carbon dioxide gas, which is injected into the reactor, further includes water.

4. The reducing method of carbon dioxide using sunlight and hydrogen of claim 3, wherein the water is included in a gas mixture of hydrogen gas and carbon dioxide gas containing water, which is obtained by bubbling the hydrogen gas and the carbon dioxide gas into water before injecting the hydrogen gas and the carbon dioxide gas into the reactor.

5. The reducing method of carbon dioxide using sunlight and hydrogen of claim 1, wherein the hydrogen gas is supplied from a water decomposition reactor to the reactor.

6. The reducing method of carbon dioxide using sunlight and hydrogen of claim 5, wherein the water decomposition reactor includes a photocatalyst for water decomposition to produce oxygen and hydrogen by water decomposition under sunlight irradiation, and the produced oxygen is removed and the produced hydrogen is supplied to the reactor.

7. The reducing method of carbon dioxide using sunlight and hydrogen of claim 1, wherein a temperature of the reactor is set by the irradiation of the sunlight.

8. The reducing method of carbon dioxide using sunlight and hydrogen of claim 1, wherein the composite catalyst has a form in which a particle of the metal and the photosensitizer are coated on a surface of a support containing the metal compound.

9. The reducing method of carbon dioxide using sunlight and hydrogen of claim 8, wherein the support has a form of a particle, a mesoporous structure, a rod, a fiber, or a tube, having a size of from a nanometer unit to a micrometer unit.

10. The reducing method of carbon dioxide using sunlight and hydrogen of claim 8, wherein the support includes a pore in a size of a nanometer unit.

11. The reducing method of carbon dioxide using sunlight and hydrogen of claim 2, wherein the metal carbide includes SiC or a carbide of a transition metal.

12. The reducing method of carbon dioxide using sunlight and hydrogen of claim 1, wherein the photosensitizer is a compound including a linker containing a functional group selected from the group consisting of —$CO_2H$, —$PO_3H$, —$NH_2$, and combinations thereof.

13. The reducing method of carbon dioxide using sunlight and hydrogen of claim 1, wherein the photosensitizer is a compound which does not include a linker containing a functional group selected from the group consisting of —$CO_2H$, —$PO_3H$, —$NH_2$, and combinations thereof.

14. The reducing method of carbon dioxide using sunlight and hydrogen of claim 1, wherein a product containing a hydrocarbon is obtained by reacting the hydrogen gas with the carbon dioxide gas.

15. A reaction apparatus for reducing carbon dioxide using sunlight and hydrogen, comprising:
   a reactor including a light transmission member on at least one side; and
   a hydrogen gas supplying member, a carbon dioxide gas supplying member, and a product outlet member which are connected to the reactor,
   wherein hydrogen gas is supplied to the reactor through the hydrogen gas supplying member, carbon dioxide gas is supplied to the reactor through the carbon dioxide gas supplying member, and sunlight is irradiated to the reactor through the light transmission member in the presence of a composite catalyst containing a metal, a metal compound, and a photosensitizer loaded into the reactor so that the hydrogen gas and the carbon dioxide gas are reacted.

16. The reaction apparatus for reducing carbon dioxide using sunlight and hydrogen of claim 15, wherein the metal compound includes a member selected from the group consisting of a metal oxide, a metal carbide, a metal oxycarbide, and combinations thereof.

17. The reaction apparatus for reducing carbon dioxide using sunlight and hydrogen of claim 15, further comprising:
   a water supplying member connected to the reactor.

18. The reaction apparatus for reducing carbon dioxide using sunlight and hydrogen of claim 15, wherein the water supplying member sprays water into the reactor or supplies water in a form of steam into the reactor.

19. The reaction apparatus for reducing carbon dioxide using sunlight and hydrogen of claim 15, wherein the hydrogen gas supplying member is connected to an apparatus for water decomposition reaction.

20. The reaction apparatus for reducing carbon dioxide using sunlight and hydrogen of claim 19, wherein the apparatus for water decomposition reaction includes a water decomposition reactor and a separating member connected to the water decomposition reactor, and the separating member includes a oxygen outlet member and a hydrogen outlet member, and the hydrogen outlet member is connected to the hydrogen gas supplying member.

\* \* \* \* \*